US012239968B2

United States Patent
Onoe et al.

(10) Patent No.: US 12,239,968 B2
(45) Date of Patent: Mar. 4, 2025

(54) PARTICULATE FILTER

(71) Applicant: CATALER CORPORATION, Kakegawa (JP)

(72) Inventors: Ryota Onoe, Kakegawa (JP); Ryo Tasaki, Kakegawa (JP); Momoko Iwai, Kakegawa (JP); Yamato Matsushita, Kakegawa (JP)

(73) Assignee: CATALER CORPORATION, Kakegawa (JP)

( * ) Notice: Subject to any disclaimer, the term of this patent is extended or adjusted under 35 U.S.C. 154(b) by 727 days.

(21) Appl. No.: 17/440,817

(22) PCT Filed: Jun. 1, 2020

(86) PCT No.: PCT/JP2020/021608
§ 371 (c)(1),
(2) Date: Sep. 20, 2021

(87) PCT Pub. No.: WO2020/255687
PCT Pub. Date: Dec. 24, 2020

(65) Prior Publication Data
US 2022/0184591 A1 Jun. 16, 2022

(30) Foreign Application Priority Data

Jun. 18, 2019 (JP) .................. 2019-112755

(51) Int. Cl.
*B01J 35/56* (2024.01)
*B01D 46/24* (2006.01)
(Continued)

(52) U.S. Cl.
CPC .......... *B01J 35/56* (2024.01); *B01D 46/2418* (2013.01); *B01D 46/82* (2022.01); *B01J 23/58* (2013.01);
(Continued)

(58) Field of Classification Search
None
See application file for complete search history.

(56) References Cited

U.S. PATENT DOCUMENTS

2005/0002838 A1 1/2005 Mogensen
2007/0009401 A1 1/2007 Kolbeck et al.
(Continued)

FOREIGN PATENT DOCUMENTS

CN 1576528 A 2/2005
CN 101042064 A 9/2007
(Continued)

OTHER PUBLICATIONS

Aug. 4, 2020 International Search Report issued in International Patent Application No. PCT/JP2020/021608.
(Continued)

*Primary Examiner* — Jelitza M Perez
(74) *Attorney, Agent, or Firm* — Oliff PLC

(57) ABSTRACT

A particulate filter includes a base material having a wall-flow structure including porous partition walls partitioning inlet and outlet cells, and wash-coating layers held inside partition walls. The wash-coating layers include inlet layers each formed from vicinity of an end portion at exhaust gas inflow side to have predetermined length and thickness and outlet layers each formed from vicinity of end portion at exhaust gas outflow side to have a predetermined length and thickness. The inlet and the outlet layers partially overlap with each other. Inlet layers of particulate filter contain substantially no noble metal catalyst, and outlet layers contain noble metal catalyst. Accordingly, PM collection performance can be easily enhanced in inlet region, and high gas distributability (pressure loss suppression performance) can be maintained in outlet region. Accordingly, it is possible to provide particulate filter capable of achieving high (Continued)

levels of PM collection performance and pressure loss suppression performance.

9 Claims, 5 Drawing Sheets

(51) Int. Cl.
    *B01D 46/82* (2022.01)
    *B01J 23/58* (2006.01)
    *F01N 3/022* (2006.01)
    *F01N 3/035* (2006.01)

(52) U.S. Cl.
    CPC ........... *F01N 3/0222* (2013.01); *F01N 3/035* (2013.01); *B01D 2279/30* (2013.01)

(56) References Cited

U.S. PATENT DOCUMENTS

| | | | |
|---|---|---|---|
| 2007/0221312 | A1 | 9/2007 | Ichikawa |
| 2009/0137386 | A1 | 5/2009 | Pfeifer et al. |
| 2009/0229259 | A1 | 9/2009 | Mizutani |
| 2010/0175372 | A1* | 7/2010 | Lambert ............... F01N 3/2066 60/297 |
| 2011/0271664 | A1 | 11/2011 | Boorse et al. |
| 2016/0115835 | A1 | 4/2016 | Daido et al. |
| 2016/0281562 | A1 | 9/2016 | Miyairi et al. |
| 2017/0122176 | A1 | 5/2017 | Nomura et al. |
| 2017/0298797 | A1 | 10/2017 | Onoe et al. |
| 2018/0021726 | A1 | 1/2018 | Onoe et al. |
| 2018/0028972 | A1 | 2/2018 | Kitamura et al. |
| 2018/0111088 | A1* | 4/2018 | Li .................... B01D 46/24492 |
| 2018/0133648 | A1 | 5/2018 | Sekine et al. |
| 2021/0060487 | A1* | 3/2021 | Onoe .................... F01N 3/0222 |

FOREIGN PATENT DOCUMENTS

| | | |
|---|---|---|
| CN | 101600858 A | 12/2009 |
| CN | 106943874 A | 7/2017 |
| CN | 107073447 A | 8/2017 |
| CN | 107249737 A | 10/2017 |
| CN | 107249738 A | 10/2017 |
| CN | 108698037 A | 10/2018 |
| EP | 1 719 553 A2 | 11/2006 |
| EP | 3 689 457 A1 | 8/2020 |
| JP | 2007-132240 A | 5/2007 |
| JP | 2008-510605 A | 4/2008 |
| JP | 2009-220029 A | 10/2009 |
| JP | 2009-243273 A | 10/2009 |
| JP | 2013-015087 A | 1/2013 |
| JP | 5993009 B2 | 9/2016 |
| JP | 2016-182536 A | 10/2016 |
| JP | 2017-510439 A | 4/2017 |
| JP | 2018-515328 A | 6/2018 |
| WO | 2008/070551 A2 | 6/2008 |
| WO | 2015/136461 A2 | 9/2015 |
| WO | 2016/160953 A1 | 10/2016 |
| WO | 2019/065206 A1 | 4/2019 |

OTHER PUBLICATIONS

Sep. 11, 2023 Office Action issued in Chinese Patent Application No. 202080029678.6.
Dec. 21, 2021 International Preliminary Report on Patentability issued in International Patent Application No. PCT/JP2020/021608.
Feb. 3, 2022 Examination Report issued in Indian Patent Application No. 202127044216.
Apr. 25, 2022 extended Search Report issued in European Patent Application No. 20827752.5.
Jul. 4, 2022 Office Action issued in Chinese Patent Application No. 202080029678.6.
Nov. 22, 2022 Office Action issued in Chinese Patent Application No. 202080029678.6.
Jan. 5, 2023 Office Action issued in Japanese Patent Application No. 2019-112755.
Feb. 13, 2023 Office Action issued in Indian Patent Application No. 202127044216.
Jun. 7, 2023 Office Action issued in Chinese Patent Application No. 202080029678.6.

* cited by examiner

PARTICULATE FILTER

TECHNICAL FIELD

The present invention relates to a particulate filter. In particular, the present invention relates to a particulate filter for collecting particulate matter (PM) included in an exhaust gas discharged from an internal combustion engine.

This application claims the benefit of priority to Japanese Patent Application No. 2019-112755 filed on Jun. 18, 2019. The entire contents of this application are hereby incorporated herein by reference.

BACKGROUND ART

An exhaust gas from an internal combustion engine using, for example, gasoline or diesel oil as fuel contains particulate matter (hereinafter referred to as "PM") including carbon as a main component, in addition to gas constituents such as hydrocarbon (HC), carbon monoxide (CO), and nitrogen oxide (NOx). Similarly to the gas constituents such as HC, CO, and NOx, the emission amount of PM is restricted in consideration of the influence on the human body.

As an example of a technique for removing PM from an exhaust gas, a particulate filter (hereinafter referred to as simply as a "filter") for collecting PM is disposed in an exhaust passage of an internal combustion engine. Examples of the particulate filter include a wall flow filter. This wall flow filter uses a honeycomb base material having a plurality of hollow portions (cells), and is configured by alternately forming inlet cells whose outlets are closed and outlet cells whose inlets are closed. An exhaust gas supplied to the wall flow filter flows into the inlet cells, passes through partition walls of a porous material, and then is discharged to the outside of the filter through the outlet cells. In this process, PM in the exhaust gas is collected in pores of the partition walls. In such a wall flow filter, a wash-coating layer is formed in some cases on the inner sides of the partition walls (wall surfaces of pores) in order to enhance stability at high temperatures and PM collection performance.

In a wall flow filter of this type, when the amount of PM accumulation in pores of the partition walls increases, clogging of the pores reduces gas distributability, resulting in the possibility of an increase in pressure loss. In view of this, in recent particulate filters, a noble metal catalyst for promoting oxidation (combustion) of PM accumulated in pores is supported on a wash-coating layer. Examples of the particulate filter carrying noble metal catalysts are disclosed in Patent Documents 1 and 2.

CITATION LIST

Patent Document

Patent Document 1: Japanese Unexamined Patent Application Publication No. 2009-220029
Patent Document 2: Japanese Unexamined Patent Application Publication No. 2016-182536

SUMMARY OF INVENTION

Technical Problems

In recent years, regulations on PM emission have been tightened, and thus, a particulate filter having higher PM collection performance than before has been demanded. Through a study conducted in response to the demand, inventors of the present invention found that PM is collected in pores having small pore size by priority and that the pore size of partition walls is reduced by an increase in PM accumulation amount in a wall flow filter. From these findings, the inventors assumed that PM collection performance is enhanced with an increase in PM accumulation amount by continuous use in the wall flow filter.

However, as described above, when the PM accumulation amount in pores increases, decrease in gas distributability might cause a pressure loss. In view of this, recent particulate filters are configured such that a noble metal catalyst for promoting PM combustion is supported on a wash-coating layer. In a particulate filter having such a structure, it is difficult to obtain the benefit of enhanced PM collection performance due to an increase in PM accumulation amount. As described above, it was found difficult for a filter with a wall-flow structure to obtain high levels of both PM collection performance and pressure loss suppression performance.

The present invention has been made in view of the foregoing circumstances, and has a main object of providing a particulate filter capable of obtaining high levels of both PM collection performance and pressure loss suppression performance.

Solution to Problems

In conducting a study for solving the problems described above, the inventors were focused on the following aspects.

There is a tendency in which a low-temperature exhaust gas having a large PM content is emitted in an initial stage of operation immediately after an internal combustion engine starts operating whereas a high-temperature exhaust gas having a small PM content is emitted in an intermediate stage of operation in which operation is stabilized. In addition, the exhaust gas emitted in the initial stage of operation flows at a low flow rate, and thus, tends to pass through partition walls in an upstream side in a gas flow direction. On the other hand, the exhaust gas emitted in the intermediate stage of operation flows at a relatively high flow rate, and thus, tends to pass through partition walls at a downstream side.

The inventors focused on differences in PM content and exhaust gas flow rate depending on the operation stage and conducted various studies, to arrive at the idea of providing no noble metal catalyst in an upstream region of partition walls and providing a noble metal catalyst in a downstream region of the partition walls.

First, the absence of the noble metal catalyst in the upstream region of the partition walls facilitates enhancement of PM collection performance due to an increase in PM accumulation amount in the upstream region. Accordingly, PM can be suitably removed from the exhaust gas in the initial stage of operation having a large PM content and passing through the upstream region. In addition, since the exhaust gas in the initial stage of operation flows at a low flow rate, even in a case where the exhaust gas passes through the upstream region in which a relatively small pore size is maintained, an abrupt pressure loss does not easily occur.

On the other hand, the presence of the noble metal catalyst in the downstream region of the partition walls facilitates recovery of gas distributability due to PM combustion in the downstream region. Accordingly, an increase in pressure loss in the intermediate stage of operation in which an exhaust gas at a high flow rate can be suitably suppressed.

In addition, since the exhaust gas in the intermediate stage of operation has a small PM content, PM can be sufficiently removed even in the downstream region in which a relatively large pore size is maintained.

The particulate filter disclosed here has been made based on the foregoing findings. The particulate filter is disposed in an exhaust passage of an internal combustion engine and used for collecting particulate matter in an exhaust gas emitted from the internal combustion engine. The particulate filter includes: a base material having a wall-flow structure, the base material including an inlet cell, an outlet cell, and a porous partition wall, the inlet cell being open only in an end portion at an exhaust gas inflow side, the outlet cell being adjacent to the inlet cell, the outlet cell being open only in an end portion at an exhaust gas outflow side, the porous partition wall partitioning the inlet cell and the outlet cell; and a wash-coating layer formed inside the partition wall. The wash-coating layer includes an inlet layer having a predetermined thickness from a surface of the partition wall in contact with the inlet cell toward inside of the partition wall, the inlet layer having a predetermined length from a vicinity of the end portion at the exhaust gas inflow side along an extension direction of the partition wall, and an outlet layer having a predetermined thickness from a surface of the partition wall in contact with the outlet cell toward inside of the partition wall, the outlet layer having a predetermined length from a vicinity of the end portion at the exhaust gas outflow side along the extension direction of the partition wall. The thickness and the length of each of the inlet layer and the outlet layer are set such that the inlet layer and the outlet layer partially overlap with each other. The inlet layer contains substantially no noble metal catalyst that promotes combustion of the particulate matter, whereas the outlet layer contains the noble metal catalyst.

In the particulate filter disclosed here, PM collection performance in the inlet region where substantially no noble metal catalyst is present can be easily enhanced, and thus, PM can be suitably removed from an exhaust gas in an initial stage of operation. In addition, since high gas distributability is maintained in the outlet region where the noble metal catalyst is present, even when an exhaust gas in an initial stage of operation at high flow rate is supplied, an abrupt increase in pressure loss can be suitably suppressed. As described above, in the particulate filter disclosed here, high levels of both PM collection performance and pressure loss suppression performance can be achieved.

In this specification, for convenience of description, a region where only the inlet layer is formed and substantially no noble metal catalyst is present will be referred to as an "inlet region." A region where the outlet layer is formed and the noble metal catalyst is present will be referred to as an "outlet region." That is, in the particulate filter disclosed here, the inlet layer and the outlet layer partially overlap with each other in order to avoid occurrence of a region where no wash-coating layer is formed, and the region where the inlet layer and the outlet layer overlap with each other is regarded as an "outlet region" because the noble metal catalyst is present.

In a preferred aspect of the n a preferred aspect of the particulate filter disclosed here, a content of the noble metal catalyst in the outlet layer is 0.1 g/L or more. In this manner, higher gas distributability can be maintained in the outlet region.

In a preferred aspect of the particulate filter disclosed here, supposing an overall length of the partition wall in the extension direction is 100%, a region of the wash-coating layer containing substantially no noble metal catalyst (i.e., the inlet region) is formed in a region of 30% or more and 60% or less from a vicinity of the end portion at the exhaust gas outflow side. Accordingly, higher levels of both PM collection performance and pressure loss suppression performance can be achieved.

In a preferred aspect of the particulate filter disclosed here, supposing a thickness of the partition wall is 100%, the inlet layer has a thickness of 75% or more and 100% or less from a surface in contact with the inlet cell toward inside of the partition wall. Accordingly, PM collection performance can be more suitably enhanced in the inlet region.

In a preferred aspect of the particulate filter disclosed here, supposing a thickness of the partition wall is 100%, the outlet layer has a thickness of 75% or more and 100% or less from a surface in contact with the outlet cell toward inside of the partition wall. Accordingly, higher levels of both PM collection performance and pressure loss suppression performance can be achieved in the outlet region.

In a preferred aspect of the particulate filter disclosed here, a ratio (W/V) of a total coating amount W of the wash-coating layer to an effective volume V of pores of the partition wall in the entire base material is 200 g/L or more and 400 g/L or less. Experiments conducted by the inventors of the present invention show that higher levels of PM collection performance and pressure loss suppression performance by controlling the ratio W/V within a predetermined range.

In the aspect in which the ratio W/V is controlled, the ratio W/V is more preferably controlled such that substantially no wash-coating layer is present on a surface of the partition wall. Accordingly, an abrupt increase in pressure loss can be more suitably suppressed.

In a preferred aspect of the particulate filter disclosed here, the noble metal catalyst contains at least one platinum-group element selected from the group consisting of Pt, Pd, and Rh. These platinum group elements have high PM combustion promotion effect, and thus, higher gas distributability can be maintained in the outlet region.

In a preferred aspect of the particulate filter disclosed here, the internal combustion engine is a gasoline engine. An exhaust gas from the gasoline engine is at a relatively high temperature and PM in this exhaust gas easily burns. Thus, enhancement of PM collection performance due to PM accumulation tends not to occur easily. Ein a case where the particulate filter disclosed here is disposed in an exhaust gas of such a gasoline engine, PM can be suitably accumulated in the inlet region. Thus, the particulate filter can be especially suitably used as a gasoline particulate filter (GPF) for a gasoline engine.

DESCRIPTION OF PREFERRED EMBODIMENTS

An embodiment of the present invention will be described with reference to the drawings. Matters not specifically mentioned in the description but required for carrying out the invention (e.g., general information on arrangement of a particulate filter in an exhaust passage) can be understood as matters of design variation of a person skilled in the art based on related art in the field. The present invention can be carried out on the basis of the contents disclosed in the description and common general knowledge in the field. The expression "A to B" representing a numerical value range herein refers to "A or more and B or less."

A. Overall Configuration

Figure 1:
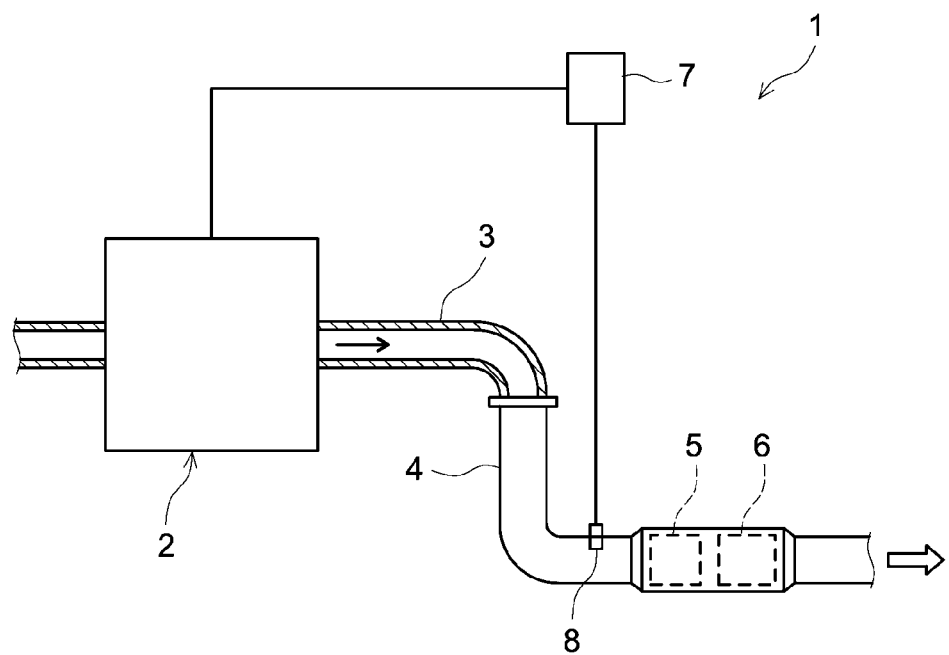
FIG. 1 schematically illustrates an exhaust system in which a particulate filter according to one preferred embodiment is disposed.

First, an overall configuration of an exhaust gas purification device using a particulate filter according to a preferred embodiment will be described FIG. 1 schematically illustrates an exhaust system in which a particulate filter according to this preferred embodiment is disposed. In the exhaust system illustrated in FIG. 1, an exhaust gas purification device 1 is disposed in an exhaust passage of an internal combustion engine 2.

The internal combustion engine 2 is supplied with an air-fuel mixture including oxygen and a fuel gas. The internal combustion engine 2 converts thermal energy obtained by combustion of this air-fuel mixture to kinetic energy. Then, an exhaust gas generated by combustion of the air-fuel mixture is emitted to an exhaust passage constituted by an exhaust manifold 3 and an exhaust pipe 4, as indicated by an arrow in FIG. 1. In this specification, a side toward the internal combustion engine 2 in a flow direction of an exhaust gas will be referred to as an upstream side, and a side away from the internal combustion engine 2 will be referred to as a downstream side, for convenience of description.

The exhaust gas purification device 1 purifies an exhaust gas emitted into the exhaust passage. The exhaust gas purification device 1 includes an engine control unit (ECU) 7 and a sensor 8. The sensor 8 detects information on components and temperature of an exhaust gas. The ECU 7 receives detection results of the sensor 8 as information for controlling operation of the internal combustion engine 2. In addition, the exhaust gas purification device 1 illustrated in FIG. 1 includes a catalyst portion 5 and a filter portion 6.

The catalyst portion 5 is disposed inside the exhaust pipe 4. The catalyst portion 5 can use an exhaust gas purifying catalyst for purifying ternary components (NOx, HC, and CO) in an exhaust gas. A specific structure of the exhaust gas purifying catalyst used in the catalyst portion 5 is not a feature of the present invention, and thus, detailed description thereof is omitted. In the exhaust gas purification device 1 illustrated in FIG. 1, the catalyst portion 5 is disposed upstream of the filter portion 6, but the location of the catalyst portion is not specifically limited. For example, the catalyst portion may be disposed downstream of the filter portion, or a pair of catalyst portions may be respectively disposed at the upstream side and the downstream side of the filter portion.

The filter portion 6 collects particulate matter (PM) in an exhaust gas to thereby purify the exhaust gas. The particulate filter according to this preferred embodiment can be used for the filter portion 6 of the exhaust gas purification device 1. In other words, the particulate filter according to this preferred embodiment serves as a component of the exhaust gas purification device 1 and is disposed in an exhaust passage (exhaust pipe 4) of the internal combustion engine 2.

B. Particulate Filter

Figure 2:
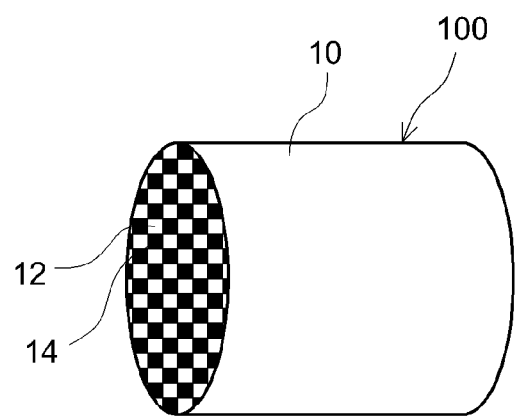
FIG. 2 is a perspective view schematically illustrating a particulate filter according to one preferred embodiment.
Figure 3:
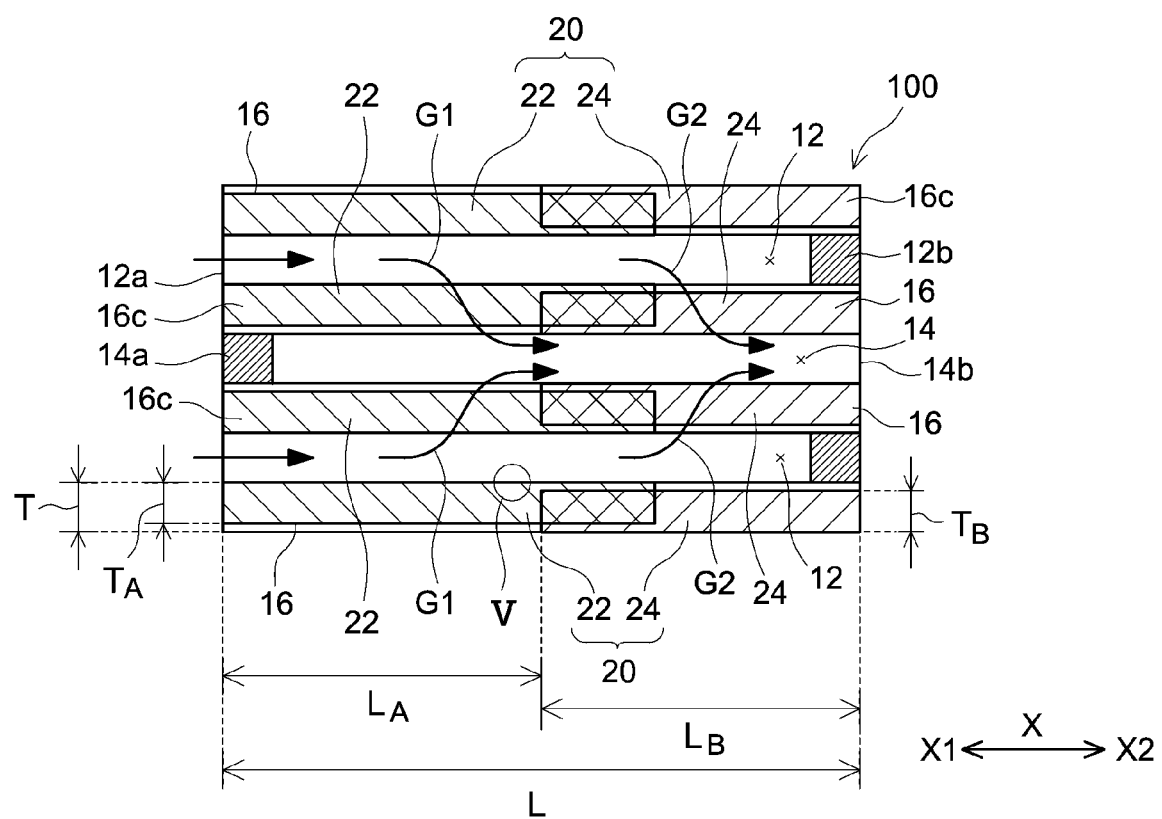
FIG. 3 schematically illustrates a cross section when a particulate filter according to one preferred embodiment is cut off along an extension direction.
Figure 4:
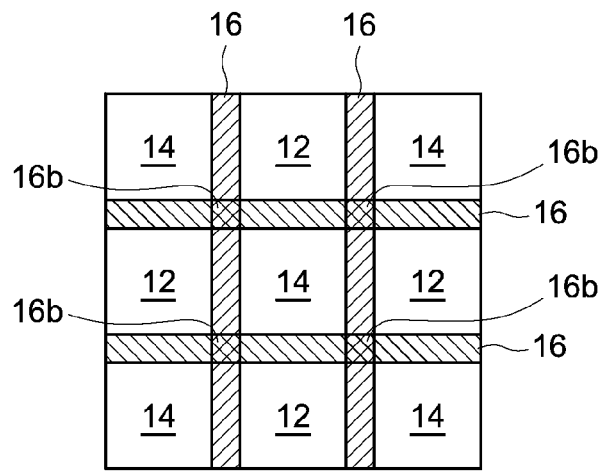
FIG. 4 schematically illustrates a cross section when a particulate filter according to one preferred embodiment is cut off along a radial direction.
Figure 5:
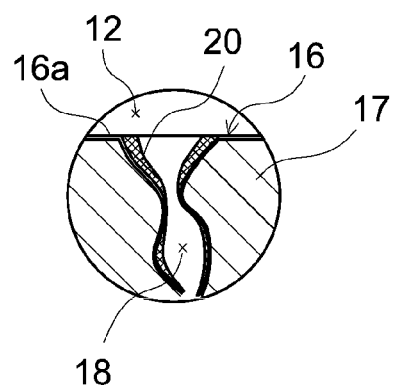
FIG. 5 is a cross-sectional schematic view illustrating a region V in FIG. 3 in an enlarged manner.

A particulate filter according to this preferred embodiment will be hereinafter described with reference to FIGS. 2 through 5. Character X in FIGS. 2 and 3 denotes a "distribution direction of an exhaust gas." Character X1 denotes an "exhaust gas inflow side (upstream side)" and character X2 denotes an "exhaust gas outflow side (downstream side)." FIG. 2 is a perspective view schematically illustrating the particulate filter according to this preferred embodiment. FIG. 3 schematically illustrates a cross section of the particulate filter illustrated in FIG. 2 taken along an extension direction (exhaust gas distribution directions X). FIG. 4 schematically illustrates a cross section taken along a radial direction of the particulate filter (direction perpendicular to the exhaust gas distribution directions X). FIG. 5 is a cross-sectional schematic view illustrating a region V in FIG. 3 in an enlarged manner.

As illustrated in FIGS. 2 through 5, a particulate filter 100 according to this preferred embodiment includes a base material 10 having a wall-flow structure, and wash-coating layers 20 formed in partition walls 16 of the base material 10. These components will be described below.

1. Base Material

As illustrated in FIG. 2, the particulate filter 100 according to this preferred embodiment uses the cylindrical base material 10 extending along the exhaust gas distribution directions X. As described above, the base material 10 has a wall-flow structure. Specifically, the base material 10 has a honeycomb structure including a plurality of hollow portions (cells 12 and 14). These cells 12 and 14 extend along the exhaust gas distribution directions X. As illustrated in FIGS. 3 and 4, the cells 12 and 14 of the base material 10 in this preferred embodiment are constituted by inlet cells 12 and outlet cells 14 adjacent to the inlet cells 12. The inlet cells 12 and the outlet cells 14 are separated from one another by the porous partition walls 16. As the material of the base material 10, various materials that can be used for conventional applications of this type may be used without particular limitation. Examples of the material of the base material 10 include ceramics such as cordierite and silicon carbide (SiC) and alloys (e.g., stainless). In this preferred embodiment, although the cylindrical base material 10 is used, the outer shape of the base material is not specifically limited, and may be an oval or a polygonal prism, for example.

The inlet cells 12 refer to cells that are open only at the exhaust gas inflow side X1 (see FIG. 3) among the cells 12 and 14 formed in the base material 10. Specifically, the inlet cells 12 are open to the outside of the filter with the ends at the exhaust gas inflow side X1 serving as gas inflow ports 12a, and with the ends at the exhaust gas outflow side X2 sealed by sealing portions 12b. On the other hand, the outlet cells 14 refer to cells that are open only at the exhaust gas outflow side X2. Specifically, the ends of the outlet cells 14 at the exhaust gas inflow side X1 are sealed by sealing portions 14a, and the ends of the outlet cells 14 at the exhaust gas outflow side X2 serve as gas outflow ports 14b and are open to the outside of the filter.

The shapes and sizes of the inlet cells 12 and the outlet cells 14 may be suitably changed in consideration of a flow rate and components of an exhaust gas supplied to the particulate filter 100. For example, as illustrated in FIG. 4, in this preferred embodiment, the cells 12 and 14 have square cross-sectional shape in a cross section orthogonal to the extension directions X of the base material 10 (cross section along the radial direction of the base material 10). The cross-sectional area of the inlet cells 12 and the cross-sectional area of the outlet cells 14 may be approximately the same, or may be different in consideration of a flow rate of an exhaust gas. The cross-sectional shapes of the cells 12 and 14 are not limited to the square as described in this preferred embodiment, and general shapes such as a parallelogram, a rectangle, a trapezoid, a triangle, a pentagon, or a circle may be employed without any particular limitation.

As illustrated in FIGS. 2 and 4, the base material 10 is formed such that the inlet cells 12 and the outlet cells 14 are adjacent to one another. The base material 10 of this preferred embodiment are formed such that the inlet cells 12 and the outlet cells 14 having square cross sections are arranged in a checkerboard pattern.

As described above, the inlet cells 12 and the outlet cells 14 are partitioned from one another by the partition walls 16. In this preferred embodiment, each of the partition walls 16 formed in an array extends along the exhaust gas distribution directions X, and spaces surrounded by the partition walls 16 serve as the cells 12 and 14 (see FIGS. 3 and 4). The partition walls 16 have a porous structure having a plurality of pores. Specifically, wall bodies 17 of the partition walls 16 have a plurality of pores 18 as illustrated in FIG. 5, and inlet cells and outlet cells communicate with one another through some of the pores 18. Accordingly, as indicated by arrows in FIG. 3, an exhaust gas that has flowed into the inlet cells 12 passes through the partition walls 16 and flows out to the outlet cells 14. The thickness T and the overall length L of the partition walls 16 are preferably adjusted from the viewpoint of obtaining both PM collection performance and pressure loss suppression performance. For example, the thickness T of the partition walls 16 is preferably about 0.2 mm to about 1.6 mm. The overall length L of the partition walls 16 is preferably about 50 mm to about 500 mm (more preferably 100 mm to 200 mm).

From the viewpoint of suppressing an increase in pressure loss, a pore ratio of the partition walls 16 is preferably 40% or more, more preferably 45% or more, much more preferably 50% or more, and especially preferably 55% or more. On other hand, from the viewpoint of maintaining mechanical strength of the base material 10, the upper limit of the pore ratio of the partition walls 16 is preferably 80% or less, more preferably 75% or less, much more preferably 70% or less, and especially preferably 65% or less. The "pore ratio of the partition wall" herein refers to the proportion of the volume of the pores 18 to the total volume (total volume of the wall bodies 17 and the pores 18) of the partition walls 16 of the base material 10, and is a value measured by mercury intrusion porosimetry.

From the viewpoint of enhancing pressure loss suppression performance, the average pore size of the pores 18 is preferably 1 μm or more, more preferably 5 μm or more, much more preferably 7 μm or more, and especially preferably 10 μm or more. On the other hand, from the viewpoint of enhancing PM collection performance, the upper limit of the average pore size of the pores 18 is preferably 50 μm or less, more preferably 40 μm or less, much more preferably 30 μm or less, and especially preferably 25 μm or less. The "average pore size of the pores 18" herein refers to an average value in pore distribution obtained by mercury intrusion porosimetry.

2. Wash-Coating Layer

As illustrated in FIG. 3, the wash-coating layers 20 are coating layers formed inside the partition walls 16 of the base material 10. Specifically, as illustrated in FIG. 5, the wash-coating layers 20 are porous heat-resistance layers formed on the wall surfaces of the pores 18 (i.e., surfaces of the wall bodies 17 in contact with the pores 18). The wash-coating layers 20 can have the function of enhancing stability at high temperatures and absorbing property, for example. The wash-coating layers 20 can contribute to enhancement of PM collection performance achieved by increasing the surface area and reducing the size of the pores 18. The wash-coating layers 20 in this preferred embodiment can use materials known to date without any particular limitation. The wash-coating layers 20 are typically made of a heat-resistant material as a main component. Typically, the content of the heat-resistant material in the wash-coating layers 20 is preferably 50% by mass or more and more preferably 85% by mass or more. As the heat-resistant material, a refractory defined by JIS R2001 can be used. Examples of the refractory include neutral refractories such as alumina ($Al_2O_3$), acid refractories such as silica ($SiO_2$) and zirconia ($ZrO_2$), and basic refractories such as magnesia (MgO) and calcia (CaO). Among these refractories, alumina (preferably activated alumina) is preferable. The heat-resistant material of the wash-coating layers 20 may be constituted by only one of the refractories listed above, or a mixture (or a complex) of two or more of these refractories. Examples of the complex include ceria-zirconia complex oxide. The wash-coating layers 20 may include other materials (typically an inorganic oxide) as accessory ingredients. Examples of the accessory ingredients include rare earth metal oxides such as yttria ($Y_2O_3$) and alkaline earth metal oxides such as barium oxide (BaO).

As illustrated in FIG. 3, each of the wash-coating layers 20 in this preferred embodiment includes an inlet layer 22 and an outlet layer 24. The thicknesses and lengths of the inlet layer 22 and the outlet layer 24 are set such that the inlet layer 22 and the outlet layer 24 partially overlap with each other. These layers will be described below.

(1) Inlet Layer

The inlet layer 22 is a wash-coating layer formed in a region including the partition wall 16 near the gas inflow port 12a. Specifically, the inlet layer 22 is formed to have a predetermined thickness $T_A$ from the surface of the partition wall 16 in contact with the inlet cell 12 toward the inside of the partition wall 16, and has a predetermined length from a vicinity of an end at the exhaust gas inflow side X1 along the extension directions of the partition wall 16 (exhaust gas distribution directions X). From the viewpoint of enhancing PM collection performance, the thickness $T_A$ of the inlet layer 22 is preferably 50% or more of the thickness T of the partition wall 16, more preferably 60% or more, much more preferably 70% or more, and especially preferably 75% or more. The upper limit of the thickness $T_A$ of the inlet layer 22 is not specifically limited, and may be 100% or less of the thickness T of the partition wall 16, may be 95% or less, or may be 90% or less. As described above, a region where only the inlet layer 22 is formed will be hereinafter referred to as an "inlet region."

In the particulate filter 100 according to this preferred embodiment, the inlet layer 22 contains substantially no noble metal catalyst. Although specifically described later, a noble metal catalyst is a catalytic material having the function of promoting PM combustion, and includes a noble metal such as gold (Au), silver (Ag), palladium (Pd), rhodium (Rh), platinum (Pt), ruthenium (Ru), iridium (Ir), or osmium (Os). The presence of the inlet layer 22 containing substantially no noble metal catalyst can suppress combustion of PM accumulated in the inlet region. Thus, in the particulate filter 100 according to this preferred embodiment, PM collection performance can be easily enhanced because of an increase in the PM accumulation amount in the inlet region.

The expression "containing substantially no noble metal catalyst" herein means that components that can be interpreted as a noble metal catalyst is not added intentionally. Thus, the concept of "containing substantially no noble metal catalyst" herein includes a case where a trace amount of a component that can be interpreted as a noble metal catalyst is included from, for example, a raw material or a manufacturing process and a case where a trace amount of a noble metal catalyst has moved from another catalyst layer into the inlet layer (e.g., a case where a noble metal catalyst has moved from the outlet layer into the inlet layer). For example, the state of "containing substantially no noble metal catalyst" is established in a case where the content (g/L) of a noble metal catalyst with respect to the volume of the inlet layer 22 is 0.05 g/L or less (preferably 0.03 g/L or less, more preferably 0.01 g/L or less, much more preferably 0.005 g/L or less, and especially preferably 0.001 g/L or less).

(2) Outlet Layer

The outlet layer 24 is a wash-coating layer formed in a region including the partition wall 16 near the gas outflow port 14b. Specifically, the outlet layer 24 is formed to have a predetermined thickness TB from the surface of the partition wall 16 in contact with the outlet cell 14 toward the inside of the partition wall 16 and have a predetermined length $L_B$ from a vicinity of an end at the exhaust gas outflow side X2 along the extension directions of the partition wall 16 (exhaust gas distribution directions X). From the viewpoint of enhancing PM collection performance, the thickness TB of the outlet layer 24 is preferably 50% or more of the thickness T of the partition wall 16, more preferably 60% or more, much more preferably 70% or more, and especially preferably 75% or more. The upper limit of the thickness TB of the outlet layer 24 is not specifically limited, and may be 100% or less of the thickness T of the partition wall 16, may be 95% or less, may be 90% or less, and may be 85% or less. A region where the outlet layer 24 is formed herein will be referred to as an "outlet region." This "outlet region" includes a region where the inlet layer 22 and the outlet layer 24 overlap with each other.

In the particulate filter 100 according to this preferred embodiment, unlike the inlet layer 22 described above, the outlet layer 24 contains a noble metal catalyst. As described above, the noble metal catalyst is a catalytic material having the function of promoting PM combustion, and contains at least one of noble metal elements such as Au, Ag, Pd, Rh, Pt, Ru, Ir, and Os. Among these elements, platinum group elements such as Pt, Pd, and Rh have excellent function of promoting PM combustion, and thus, are especially preferable as noble metals contained in the outlet layer 24. In addition to the noble metal described above, the noble metal catalyst may include a carrier supporting this noble metal. Examples of a material for the carrier include alumina ($Al_2O_3$), rare earth metal oxides, alkali metal oxides, alkaline earth metal oxides, zirconia ($ZrO_2$), ceria ($CeO_2$), silica ($SiO_2$), magnesia (MgO), and titania ($TiO_2$).

The presence of the noble metal catalyst in the outlet layer 24 can promote combustion of PM accumulated in the outlet region. Accordingly, in the particulate filter 100 according to this preferred embodiment, clogging of the pores 18 of the partition wall 16 in the outlet region with PM can be prevented so that high gas distributability can be maintained in the outlet region.

The content of the noble metal catalyst in the outlet layer 24 (the content g of the noble metal catalyst with respect to a volume of 1 L of the outlet layer 24) is preferably 0.1 g/L or more. Accordingly, higher gas distributability can be maintained in the outlet region. From the viewpoint of maintaining higher gas distributability in the outlet region, the content of the noble metal catalyst in the outlet layer 24 is more preferably 0.5 g/L or more, much more preferably 0.7 g/L or more, and especially preferably 1 g/L or more. The upper limit of the noble metal catalyst in the outlet layer 24 is not specifically limited, and may be 20 g/L or less. From the viewpoint of easily forming the outlet layer 24, the content is preferably 10 g/L or less, more preferably 7 g/L or less, much more preferably 5 g/L or less, and especially preferably 2 g/L or less.

(3) Relationship Between Inlet Layer and Outlet Layer

As described above, in the particulate filter 100 according to this preferred embodiment, the inlet layer 22 and the outlet layer 24 partially overlap with each other in the extension directions of the partition walls 16 (exhaust gas distribution directions X), as illustrated in FIG. 3. This can ensure prevention of the presence of a region where no wash-coating layer is formed in the partition wall 16. At this time, the length $L_A$ of the region where only the inlet layer 22 is formed (i.e., the inlet region including no noble metal catalyst) is preferably 30% or more of the overall length L (100%) of the partition wall 16, more preferably 35% or more, and much more preferably 40% or more. As described above, by securing the length $L_A$ of the inlet region at the given level or more, an exhaust gas G1 in the initial stage of operation is allowed to pass through the inlet region appropriately. On the other hand, the upper limit of the length $L_A$ of the inlet region is preferably 70% or less, more preferably 65% or less, and much more preferably 60% or less. Accordingly, the length $L_B$ of the outlet region can be sufficiently long so that an exhaust gas G2 in the intermediate stage of operation is allowed to pass through the outlet region appropriately. A preferred example of the length $L_A$ of the inlet layer is 55%.

In the particulate filter 100 according to this preferred embodiment, the inlet layer 22 contains substantially no noble metal catalyst, and the outlet layer 24 contains a noble metal catalyst. Accordingly, high levels of PM collection performance and pressure loss suppression performance can be achieved.

Specifically, as illustrated in FIG. 3, the exhaust gas G1 in the initial stage of operation flows at a low flow rate, and thus, easily passes through the inlet region of the partition wall 16. Although the exhaust gas G1 in the initial stage of operation contains a relatively large amount of PM, since PM collection performance can be easily enhanced in the inlet region where substantially no noble metal catalyst is present in the particulate filter 100 according to this preferred embodiment, PM can be appropriately removed from the exhaust gas G1 in the initial stage of operation. In addition, the flow rate of the exhaust gas G1 in the initial stage of operation is relatively small, and thus, even when the exhaust gas G1 passes through the inlet region where the pores 18 are maintained in a relatively small size, an abrupt increase of a pressure loss does not easily occur.

On the other hand, since the flow rate of the exhaust gas G2 in the intermediate stage of operation is high, the exhaust gas G2 passes through the outlet region of the partition wall 16. In the particulate filter 100 according to this preferred embodiment, since high gas distributability is maintained in the outlet region where the noble metal catalyst is present, even when the exhaust gas in the intermediate stage of operation at a high flow rate is applied, an abrupt increase in pressure loss can be appropriately suppressed. In addition, since the exhaust gas G2 in the intermediate stage of operation has a small PM content, PM can also be sufficiently removed from the outlet region where the pores 18 are maintained in a relatively large size.

(4) Total Coating Amount of Wash-Coating Layer

In the particulate filter 100 according to this preferred embodiment, the total coating amount of the wash-coating layers 20 can affect both pressure loss suppression effect and PM collection performance. Thus, the total coating amount of the wash-coating layers 20 is preferably appropriately adjusted as necessary. The "total coating amount of the wash-coating layers" herein refers to a total weight of the wash-coating layers 20 including the inlet layers 22 and the outlet layers 24. As the total coating amount increases, the thickness of the wash-coating layers 20 adhered to the wall surfaces of the pores 18 increases, and thus, the size of the pores 18 decreases so that PM collection performance can be thereby enhanced (see FIG. 5). On the other hand, when the total coating amount excessively increases, wash-coating layers are formed on the outside of the pores 18 (i.e., surfaces 16a of the partition walls 16 adjacent to the cells 12 and 14). In this case, a pressure loss might increase abruptly, since the cells 12 and 14 are blocked by the wash-coating layers. As a result of experiments conducted by the inventors in consideration of these points, it was found that favorable PM collection performance is obtained by setting a ratio (W/V) of the total coating amount W of the wash-coating layers 20 to an effective volume V of the pores 18 of the partition walls 16 in the entire base material 10 at 200 g/L or more (preferably 250 g/L or more). It was also found that an abrupt increase of a pressure loss is prevented by setting the upper limit of the ratio W/V at 400 g/L or less (preferably 350 g/L or less).

The "effective volume V of pores of the partition walls in the entire base material" described above is obtained by multiplying the "pore ratio of the partition walls" by the "volume of the effective partition walls." As described above, the "pore ratio of the partition walls" refers to the ratio of the volume of the pores 18 to the total volume of the partition walls 16 of the base material 10 (total volume of the wall bodies 17 and the pores 18). On the other hand, the "volume of the effective partition walls" refers to the volume of partition walls through which an exhaust gas can pass. Specifically, an exhaust gas does not pass through regions 16b where the partition walls 16 intersect with each other in FIG. 4 and regions 16c in contact with the sealing portions 12b and 14a in FIG. 3. The "volume of the effective partition walls" refers to the volume of the partition walls 16 excluding the regions through which an exhaust gas does not pass. The "volume of the effective partition walls" is obtained by subtracting the volume of the cells 12 and 14 from the volume of the base material 10. At this time, the "volume of the cells 12 and 14" can be calculated by multiplying the sum of the opening areas of the cells 12 and 14 in a front view as illustrated in FIG. 4 by the overall length L of the base material 10.

From the viewpoint of ensuring prevention of an abrupt increase in a pressure loss, the ratio W/V is preferably adjusted such that substantially no wash-coating layers 20 are present on the surfaces of the partition walls 16. The expression "substantially no wash-coating layers are present on the surfaces of the partition walls" means that, supposing the total coating amount W is 100%, the amount of coating present inside the pores 18 of the partition walls 16 is 90% or more (preferably 95% or more).

(5) Other Materials

The wash-coating layers of the particulate filter disclosed here can be supplemented with other materials as long as the essence of the present invention is not impaired. Examples of materials that can be added to the wash-coating layers include a material having an oxygen storage/release capacity (OSC material), a NOx absorbent, and a selective catalytic reduction (SCR) catalyst.

The OSC material is a material that stores oxygen when the oxygen concentration in an exhaust gas is high (i.e., when the air-fuel ratio is lean) and releases oxygen when the oxygen concentration in an exhaust gas is low (i.e., when the air-fuel ratio is rich). Examples of the OSC material include a material based on cerium oxide (ceria: $CeO_2$). Examples of the material based on $CeO_2$ include a CZ-based composite material ($CeO_2$—$ZrO_2$ composite oxide). The CZ-based composite material is polycrystal or single crystal including $CeO_2$ and $ZrO_2$ as main components. Various additional components may be added to the CZ-based composite material. Examples of the additional components include rare-earth oxides, alkaline earth metal oxides, transition metals, alumina, and silica.

The OSC material has the function of maintaining an oxygen gas passing through the partition walls 16 in an oxidizing atmosphere, and thus, can exhibit the function of promoting PM combustion. Thus, even in the case of using the OSC material, the inlet layers 22 preferably contain substantially no OSC material. In this case, higher levels of pressure loss suppression performance and PM collection performance can be achieved. The expression that "the inlet layers contain substantially no OSC material" means that components that can be interpreted as the OSC materials are not intentionally added, similarly to the noble metal catalyst described above. That is, the case where "the inlet layers contain substantially no OSC material" is established when the ratio (g/L) of the content g of the OSC material to a volume of 1 L of the inlet layers 22 is 5 g/L or less (preferably 3 g/L or less, more preferably 2 g/L or less, much more preferably 1 g/L or less, and especially preferably 0.5 g/L or less).

The $NO_x$ absorbent is a material that stores $NO_x$ in an oxygen gas when the air-fuel ratio of the exhaust gas is in a lean state where oxygen is excessive, and releases $NO_x$ when the air-fuel ratio changes to a rich state. As the $NO_x$ absorbent, a basic material including one or more of metals that can provide electrons to $NO_x$ can be preferably used. For example, alkali metals such as potassium (K), sodium (Na), and cesium (Cs), alkaline earth metals such as barium (Ba) and calcium (Ca), rare earths such as lanthanoid, and metals such as silver (Ag), copper (Cu), iron (Fe), and iridium (Ir) are preferably used. Among these materials, barium compounds (e.g., barium sulfate) having high $NO_x$ storage capacity are preferable.

The SCR catalyst only needs to purify nitrogen oxide (NOx) in an exhaust gas. The SCR catalyst is not limited to a specific material, and may be β-zeolite or silicoaluminophosphate (SAPO)-based zeolite, for example, may be used. Examples of the SAPO include SAPO-5, SAPO-11, SAPO-14, SAPO-17, SAPO-18, SAPO-34, SAPO-39, SAPO-42, and SAPO-47. The SCR catalyst may include any metal component. Examples of the metal component include copper (Cu), iron (Fe), sodium (Na), potassium (K), magnesium (Mg), calcium (Ca), cobalt (Co), nickel (Ni), zinc (Zn), silver (Ag), lead (Pb), vanadium (V), chromium (Cr), molybdenum (Mo), yttrium (Y), cerium (Ce), neodymium (Nd), tungsten (W), indium (In), and iridium (Ir). The presence of the metal in the SAPO can purify NOx more efficiently. In the case where the wash-coating layers 20 contain the SCR catalyst, a reducing agent supply unit that supplies a reducing agent (e.g., urea water) for generating ammonia is preferably disposed upstream of the particulate filter (e.g., upstream of the filter portion 5 in FIG. 1).

C. Applications

As described above, the particulate filter 100 according to this preferred embodiment can be disposed, as the filter portion 5 for removing PM in an exhaust gas, in the exhaust passage of the internal combustion engine 2 (see FIG. 1). However, the particulate filter disclosed here is not limited to this example, and can be used for various applications. For example, the particulate filter disclosed here contains the noble metal catalyst in the outlet layer, and thus, can serve as a three-way catalyst for purifying hydrocarbon (HC), carbon monoxide (CO), and nitrogen oxide (NOx). Thus, the particulate filter disclosed here can be used as an exhaust gas purifying catalyst having the functions of both the catalyst portion 5 and the filter portion 6 in FIG. 1. In the case of using the particulate filter disclosed here as a three-way catalyst, the OSC material or the NOx absorbent described above, for example, is preferably added to the wash-coating layers.

Although it is not intended to limit the present invention, the particulate filter disclosed here is especially preferably used in a case where the internal combustion engine 2 is a gasoline engine for an automobile. An exhaust gas emitted from a gasoline engine is at a relatively high temperature, and thus, PM tends not to be easily accumulated in pores of partition walls. On the other hand, in the particulate filter disclosed here, since substantially no noble metal catalyst is present in the inlet region, PM can be suitably accumulated in the inlet region. Thus, even in the case where the particulate filter disclosed here is applied to the gasoline engine, PM collection performance can be suitably enhanced.

The particulate filter disclosed here is not necessarily applied to the gasoline engine, and may be used for purifying an exhaust gas from other engines (e.g., diesel engine). In particular, in the case where the SCR catalyst is added to the wash-coating layer and the reducing agent supply unit is disposed upstream of the particulate filter as described above, the particulate filter serves as both an SCR device for purifying NOx included in an exhaust gas from a diesel engine and a filter portion for removing PM.

D. Producing Method of Particulate Filter

An example of a method for producing the particulate filter 100 according to this preferred embodiment will be described. The particulate filter disclosed here is not limited to the particulate filter produced by the following method.

The particulate filter 100 according to this preferred embodiment can be produced by, for example, preparing a slurry including materials for the wash-coating layers 20 and introducing the slurry into the pores 18 of the partition walls 16 of the base material 10. Process steps of the method will be described below.

(1) Preparation of Slurry

In this process step, a slurry is prepared by dispersing the materials for the wash-coating layers 20 described above in a predetermined dispersion medium. As the dispersion medium, any dispersion media that can be used for preparing a slurry of this type can be used without any particular limitation. For example, the dispersion medium may be a polar solvent (e.g., water) or a non-polar solvent (e.g., methanol). The slurry may include an organic component for adjusting viscosity, in addition to the materials for the wash-coating layers 20 and the dispersion medium described above. Examples of the organic component for adjusting viscosity include cellulose-based polymers such as carboxymethyl cellulose (CMC), methyl cellulose (MC), hydroxypropyl methyl cellulose (HPMC), and hydroxyethylmethyl cellulose (HEMC).

In producing the particulate filter 100 according to this preferred embodiment, two types of slurries: a slurry for the inlet layer (inlet layer slurry) containing substantially no noble metal catalyst and a slurry for an outlet layer (outlet layer slurry) containing a noble metal catalyst, are prepared. The noble metal catalyst has been already described above, and thus, will not be described in detail below. The inlet layer slurry and the outlet layer slurry may be made of different materials except for the noble metal catalyst. For example, the inlet layer slurry and the outlet layer slurry can be formed to have different viscosities by varying the amount of addition and the type of the organic components so that regions where the inlet layer and the outlet layer are formed can be thereby easily adjusted.

(2) Introduction of Slurry

In this process step, the wash-coating layers 20 are formed by introducing the slurry described above into the pores 18 of the partition walls 16. The technique for introducing the slurry into the pores 18 is not specifically limited, and techniques known to date can be used without any particular limitation. Example of the method for introducing the slurry include an air blow technique and a suction coating technique. In the air blow technique, an end portion of the base material 10 is immersed in the slurry so that the slurry permeates in the cells 12 and 14, and then the base material 10 is taken out and air blow is performed, thereby introducing the slurry into the pores 18. On the other hand, in the suction coating technique, with an end portion of the base material 10 immersed in the slurry, the slurry is sucked from the other end portion of the base material 10, thereby introducing the slurry into the pores 18.

In the particulate filter 100 according to this preferred embodiment, the wash-coating layers 20 including the inlet layer 22 and the outlet layer 24 are formed. To form the wash-coating layers 20 with the suction coating technique, the gas inflow ports 12a of the base material 10 are first immersed in the inlet layer slurry, and in this state, the slurry is sucked from the gas outflow ports 14b. Accordingly, the inlet layer slurry is applied from a vicinity of an end at the exhaust gas inflow side X1 to a predetermined length and a predetermined thickness, and thus, the inlet layer 22 is formed by drying and calcining the slurry. Next, in a state where the gas outflow ports 14b of the base material 10 are immersed in the outlet layer slurry, the slurry is sucked from the gas inflow ports 12a. Accordingly, the outlet layer slurry is applied from a vicinity of an end at the exhaust gas outflow side X2 to a predetermined length and a predetermined thickness, and thus, the outlet layers 24 are formed by drying and calcining the slurry. At this time, slurry viscosity and a suction force of a suction coating device are adjusted such that regions to be coated with the slurries are controlled to thereby cause the inlet layers 22 and the outlet layers 24 after calcination to partially overlap with each other.

The order of forming the inlet layers 22 and the outlet layers 24 is not specifically limited. That is, the inlet layers 22 may be formed after the outlet layers 24 are formed. In the method described above, after the inlet layers 22 are formed by drying and calcining the inlet layer slurry, the outlet layer slurry is introduced into the base material. Alternatively, after the inlet layer slurry is dried, the outlet layer slurry may be introduced such that both the inlet layer slurry and the outlet layer slurry are calcined at the same time. In these cases, the wash-coating layers 20 including both the inlet layers 22 and the outlet layers 24 can also be formed.

In addition, air blow may be performed after introducing the slurry and before drying the slurry. This can prevent the slurry from remaining in the cells 12 and 14, and thus, formation of wash-coating layers on the surfaces 16a of the partition walls 16 adjacent to the cells 12 and 14 (see FIG. 5) can be suppressed.

In the thus-produced particulate filter 100, the inlet layers 22 contain substantially no noble metal catalyst, and the outlet layers 24 contain the noble metal catalyst. As described above, in the particulate filter 100 having the structure described above, PM collection performance can be easily enhanced in the inlet region, and a high level of pressure loss suppression performance can be maintained in the outlet region. Thus, high levels of PM collection performance and pressure loss suppression performance can be achieved as the whole of the filter.

Test Examples

Test examples concerning the present invention will be described below, but it is not intended to limit the present invention to the following test examples.

A. First Test

In this test example, a plurality of particulate filters were produced such that noble metal catalysts inside partition walls are present in different regions among the particulate filters, and PM collection performance and pressure loss suppression performance of each particulate filter were evaluated.

1. Preparation of Sample (1) Sample 1

A palladium nitrate solution, alumina powder, barium oxide powder, and ion-exchanged water were mixed, thereby preparing a Pd-containing slurry. Then, in a state where a gas inlet port of a wall flow filter base material (made of cordierite, length: 152.4 mm, cell total volume: 1.7 L) was immersed in the Pd-containing slurry, and the slurry was sucked from the gas outflow port by using a suction coating device, thereby introducing the Pd-containing slurry to an upstream side of partitions of the base material to a predetermined length and a predetermined thickness. Thereafter, the slurry was dried and calcined to thereby form an inlet layer containing a noble metal catalyst (Pd). Subsequently, the gas outflow port was immersed in the Pd-containing slurry, and the Pd-containing slurry was sucked from the inlet port, thereby introducing the Pd-containing slurry to a downstream side of the partition walls to a predetermined length and a predetermined thickness. Thereafter, the slurry was dried and calcined to thereby form an outlet layer containing a noble metal catalyst (Pd). Table 1 shows "lengths $L_A$ and $L_B$," "coating amount (the amount of introduced slurry)," and "Pd content" in each of an inlet region and an outlet region.

(2) Sample 2

In this sample, a Pd-free slurry having the same composition as that of the Pd-containing slurry of sample 1 described above was prepared except that the palladium nitrate solution (precursor of a noble metal catalyst) is not contained. That is, alumina powder, barium oxide powder, and ion-exchanged water were mixed, thereby preparing a Pd-free slurry. Then, the Pd-free slurry was introduced was introduced to each of an upstream side and a downstream side of partition walls, and was dried and calcined, thereby producing a particulate filter in which none of the inlet layer and the outlet layer contains a noble metal catalyst (Pd). The other conditions were similar to those of sample 1.

(3) Sample 3

In this sample, the Pd-containing slurry described above was introduced to the upstream side of partition walls to thereby form an inlet layer containing a noble metal catalyst (Pd), and a Pd-free slurry was introduced to the downstream side of the partition walls to thereby form an outlet layer containing no noble metal catalyst. The other conditions were similar to those of sample 1.

(4) Sample 4

In this sample, the Pd-free slurry was introduced to the upstream side of partition walls to thereby form an inlet layer containing no noble metal catalyst (Pd) and the Pd-containing slurry was introduced to the downstream side of the partition walls to thereby form an outlet layer containing a noble metal catalyst. The other conditions were similar to those of sample 1.

2. Evaluation Test (1) PM Collection Performance

In this evaluation, a PM collection ratio of each sample was measured to evaluate PM collection performance. Specifically, particulate filters of samples 1 through 4 were placed in an exhaust passage of a vehicle (2 L-gasoline engine), and the vehicle was driven in a Phase 4-mode by worldwide harmonized light duty driving test procedure (WLTP). Then, a PM emission amount X in a state where the particulate filter was installed and a PM emission amount Y in a state where the particulate filter was detached were measured, and PM collection ratio was calculated by an equation below. Table 1 shows results.

PM collection ratio (%)=[(Y−X)/Y]×100

(2) Pressure Loss Suppression Performance

Figure 6:
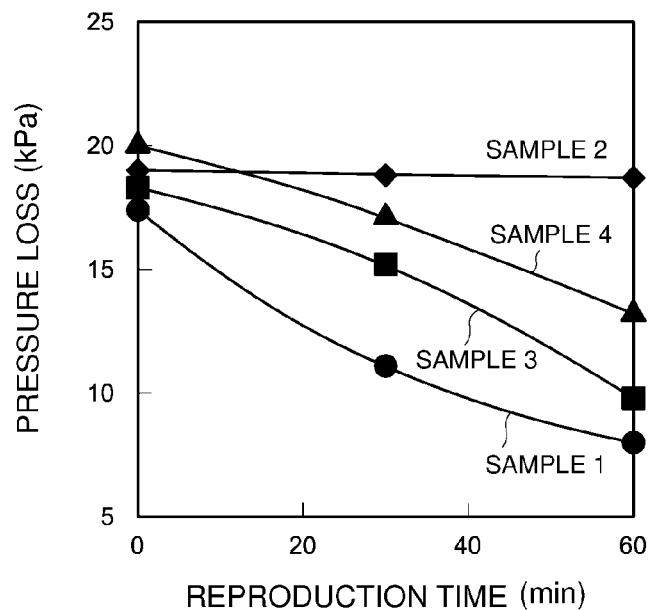
FIG. 6 is a graph showing results of pressure loss measurements in samples 1 through 4.
Figure 7:
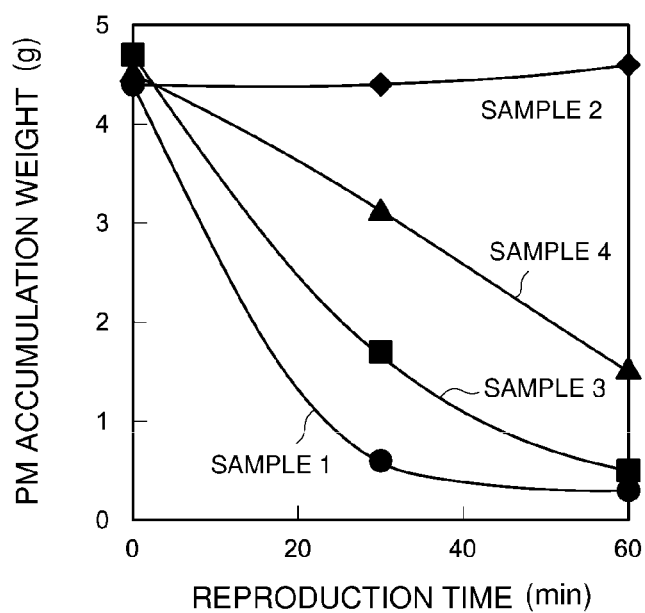
FIG. 7 is a graph showing results of PM accumulation weights of samples 1 through 4.

A reproduction process was conducted on the particulate filter of each sample to measure a change of a pressure loss in this reproduction process. Specifically, a particulate filter in which PM was accumulated by the PM collection ratio measurement was attached to an engine bench, and a reproduction process of supplying a high-temperature exhaust gas (temperature: 500° C., air-fuel ratio: 14.7) for 60 minutes was performed. Thereafter, pressure losses (kPa) after 0 minutes (immediately after start), 30 minutes, and 60 minutes from the start of the reproduction process were measured, and a change of pressure loss suppression performance in the reproduction process was examined. In this test, in measuring a pressure loss (kPa), a PM accumulation weight (g) in the filter was also measured. FIG. 6 shows measurement results of the pressure loss. FIG. 7 shows measurement results of the PM accumulation weight.

TABLE 1

|  | Inlet Region | | | Outlet Region | | | PM Collection Ratio (%) |
| --- | --- | --- | --- | --- | --- | --- | --- |
|  | Length $L_A$ (mm) | Coating Amount (g/L) | Pd Content (g/L) | Length $L_B$ (mm) | Coating Amount (g/L) | Pd Content (g/L) |  |
| Sample 1 | 60 | 30 | 0.15 | 60 | 30 | 0.15 | 69.9 |
| Sample 2 | 60 | 30 | — | 60 | 30 | — | 83.9 |

TABLE 1-continued

|  | Inlet Region | | | Outlet Region | | | PM Collection Ratio (%) |
|---|---|---|---|---|---|---|---|
|  | Length $L_A$ (mm) | Coating Amount (g/L) | Pd Content (g/L) | Length $L_B$ (mm) | Coating Amount (g/L) | Pd Content (g/L) |  |
| Sample 3 | 60 | 30 | 0.15 | 60 | 30 | — | 76.4 |
| Sample 4 | 60 | 30 | — | 60 | 30 | 0.15 | 81.4 |

3. Evaluation Result

As shown in Table 1, in evaluation of PM collection performance, high PM collection ratios of 80% or more were observed in samples 2 and 4. This shows that the absence of the noble metal catalyst (Pd) at least in the inlet layer facilitates enhancement of PM collection performance of the entire filter.

Next, as shown in FIGS. 6 and 7, in sample 2, even with the reproduction process, gas distributability was not restored, and a pressure loss remained high (PM was still accumulated). On the other hand, in samples 1, 3, and 4, with the reproduction process, gas distributability was restored, and a pressure loss decreased. This shows that suppression of an increase in pressure loss requires the presence of a noble metal catalyst (Pd) in at least one of the inlet layer or the outlet layer.

These test results demonstrate that sample 4 exhibits high PM collection performance of a PM collection ratio of 80% or more and has favorable pressure loss suppression performance that restores by a reproduction process. This shows that as in sample 4, the particulate filter in which the inlet layer contains substantially no noble metal catalyst and the outlet layer contains a noble metal catalyst achieves high levels of PM collection performance and pressure loss suppression performance.

B. Second Test

In this test example, conditions for achieving high levels of PM collection performance and pressure loss suppression performance in a particulate filter in which an inlet layer contains substantially no noble metal catalyst and an outlet layer contains a noble metal catalyst were examined.

1. Preparation of Samples

First, 12 types of particulate filters (samples 5 through 16) among which the coating amount of the inlet layer, the coating amount of the outlet layer, and the type of the base material are different were produced. Table 2 shows details of the samples. In Table 2, the "base material A" is a wall flow base material (made of cordierite, length: 152.4 mm) in which the thickness of partition walls is 0.2 mm to 0.25 mm, the number of cells is 300 cpsi, the pore ratio of the partition walls is 60% to 65%, and the cell volume is 1.3 L. On the other hand, the "base material B" is a wall flow base material (made of cordierite, length: 152.4 mm) in which the thickness of partition walls is 0.2 mm to 0.25 mm, the number of cells is 200 cpsi, the pore ratio of the partition walls is 55% to 60%, and the cell volume is 1.7 L. The other conditions of samples 5 through 16 except for conditions shown in Table 1 are the same as those in sample 4 of the first test described above.

TABLE 2

|  | Inlet Region | | | Outlet Region | | | Total | Base Material | | Coating |
|---|---|---|---|---|---|---|---|---|---|---|
|  | Coating Amount (g/L) | Coating Width (%) | Pd Content (g/L) | Coating Amount (g/L) | Coating Width (%) | Pd Content (g/L) | Coating Amount (g/L) | Type | Effective Volume (L) | Amount/Effective Volume (g/L) |
| Sample 5 | 0 | 0 | — | 0 | 0 | — | 0 | A | 0.28 | 0 |
| Sample 6 | 20.8 | 60 | — | 20.8 | 60 | 0.15 | 25 | A | 0.28 | 152.15 |
| Sample 7 | 41.7 | 60 | — | 41.7 | 60 | 0.15 | 50 | A | 0.28 | 304.31 |
| Sample 8 | 62.5 | 60 | — | 62.5 | 60 | 0.15 | 75 | A | 0.28 | 456.46 |
| Sample 9 | 83 | 60 | — | 83 | 60 | 0.15 | 100 | A | 0.28 | 608.61 |
| Sample 10 | 118.3 | 60 | — | 118.3 | 60 | 0.15 | 130 | A | 0.28 | 791.19 |
| Sample 11 | 0 | 0 | — | 0 | 0 | — | 0 | B | 0.20 | 0 |
| Sample 12 | 8.3 | 75 | — | 8.3 | 45 | 0.15 | 10 | B | 0.20 | 84.230 |
| Sample 13 | 20.8 | 75 | — | 20.8 | 45 | 0.15 | 25 | B | 0.20 | 210.58 |
| Sample 14 | 29.3 | 75 | — | 29.3 | 45 | 0.15 | 35 | B | 0.20 | 294.81 |
| Sample 15 | 41.7 | 75 | — | 41.7 | 45 | 0.15 | 50 | B | 0.20 | 421.15 |
| Sample 16 | 62.6 | 75 | — | 62.6 | 45 | 0.15 | 50 | B | 0.20 | 631.73 |

2. Evaluation Test

Figure 8:
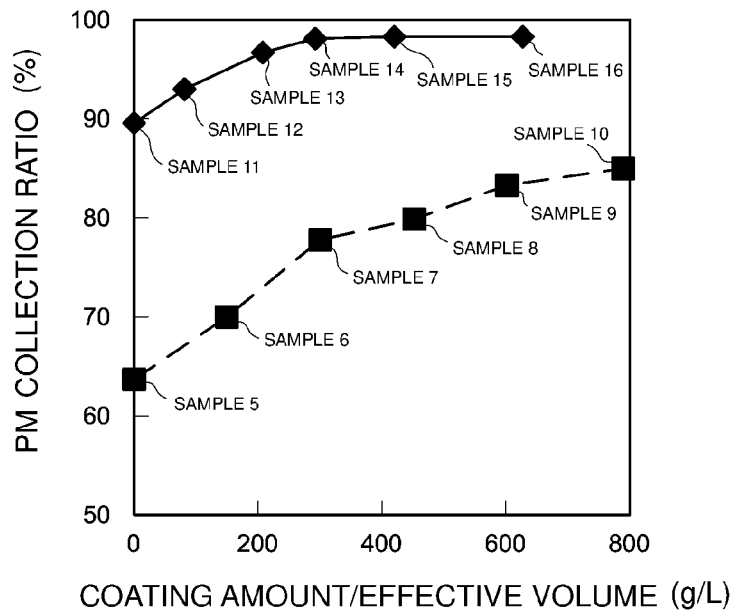
FIG. 8 is a graph showing results of PM collection ratio measurements in samples 5 through 16.
Figure 9:
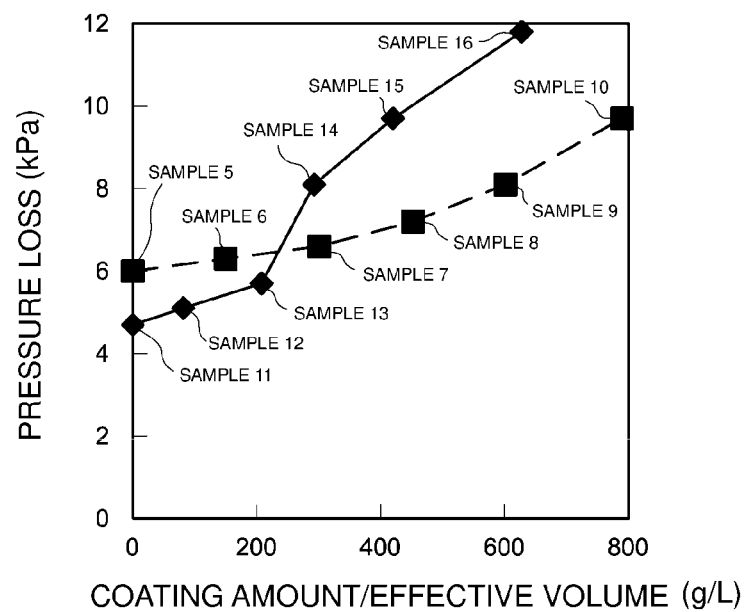
FIG. 9 is a graph showing results of pressure loss measurements in samples 5 through 16.

Under the same conditions as those of the first test, PM collection performance evaluation and a reproduction test were conducted, and a PM collection ratio and a pressure loss after 60 minutes from start of a reproduction process were measured. FIG. 8 shows measurement results of the PM collection ratio. FIG. 9 shows measurement results of the pressure loss. In FIG. 8, the ordinate represents a "PM collection ratio (%)" and the abscissa represents a "coating amount/effective volume (g/L)." In FIG. 9, the ordinate represents a "pressure loss (kPa)" and the abscissa represents a "coating amount/effective volume (g/L)." Each of FIGS. 8 and 9 shows a kinked graph connecting measurement results of samples 5 through 10 using a base material A by dotted line, and a kinked graph connecting measurement results of samples 11 through 16 using a base material B by solid lines.

3. Evaluation Result

As shown in FIG. 8, either case of using any one of the base materials A and B shows a tendency in which the PM collection ratio (%) increases as the "coating amount/effective volume" increases. If the coating amount/effective volume reaches 200 g/L or more, a sufficiently high PM collection ratio is obtained. On the other hand, if the coating amount/effective volume exceeds 400 g/L, the rate of increasing the PM collection ratio becomes low. This is supposed to be because wash-coating layers with a sufficient thickness are formed in pores of partition walls.

On the other hand, as shown in FIG. 9, either case of using any one of the base materials A and B shows a tendency in which a pressure loss increases as the "coating amount/effective volume" increases. It was confirmed that the pressure loss rapidly increases around a point when the coating amount/effective volume exceeds 400 g/L. This is supposed to be because wash-coating layers are formed on the surfaces of partition walls in contact with cells so that the cells were clogged.

These results show that to achieve high levels of PM collection performance and pressure loss suppression effect, the coating amount/effective volume is preferably 200 g/L or more and 400 g/L or less.

INDUSTRIAL APPLICABILITY

The present invention can provide a particulate filter capable of achieving high levels of PM collection performance and pressure loss suppression performance.

What is claimed is:

1. A particulate filter disposed in an exhaust passage of an internal combustion engine and configured to be used for collecting particulate matter in an exhaust gas emitted from the internal combustion engine,
the particulate filter comprising:
a base material having a wall-flow structure, the base material including an inlet cell, an outlet cell, and a porous partition wall, the inlet cell being open only in an end portion at an exhaust gas inflow side, the outlet cell being adjacent to the inlet cell, the outlet cell being open only in an end portion at an exhaust gas outflow side, the porous partition wall partitioning the inlet cell and the outlet cell; and
a wash-coating layer formed inside the partition wall, wherein
the wash-coating layer includes
an inlet layer having a predetermined thickness from a surface of the partition wall in contact with the inlet cell toward inside of the partition wall, the inlet layer having a predetermined length from a vicinity of the end portion at the exhaust gas inflow side along an extension direction of the partition wall, and
an outlet layer having a predetermined thickness from a surface of the partition wall in contact with the outlet cell toward inside of the partition wall, the outlet layer having a predetermined length from a vicinity of the end portion at the exhaust gas outflow side along the extension direction of the partition wall,
the thickness and the length of each of the inlet layer and the outlet layer are set such that the inlet layer and the outlet layer partially overlap with each other,
the inlet layer contains substantially no noble metal catalyst that promotes combustion of the particulate matter, whereas the outlet layer contains the noble metal catalyst,
the inlet layer is made of a main component or a mixture of the main component and an accessory ingredient,
the content of the main component in the inlet layer is 85% by mass or more,
the main component consists of at least one selected from the group consisting of alumina, silica, zirconia, magnesia, and calcia, and
the accessory ingredient consists of at least one selected from the group consisting of rare earth metal oxide and alkaline earth metal oxides.

2. The particulate filter according to claim 1, wherein a content of the noble metal catalyst in the outlet layer is 0.1 g/L or more.

3. The particulate filter according to claim 1, wherein when an overall length of the partition wall in the extension direction is 100%, a region of the wash-coating layer containing substantially no noble metal catalyst is formed in a region of 30% or more and 60% or less from a vicinity of the end portion at the exhaust gas inflow side.

4. The particulate filter according to claim 1, wherein when a thickness of the partition wall is 100%, the inlet layer has a thickness of 75% or more and 100% or less from a surface in contact with the inlet cell toward inside of the partition wall.

5. The particulate filter according to claim 1, wherein when a thickness of the partition wall is 100%, the outlet layer has a thickness of 75% or more and 100% or less from a surface in contact with the outlet cell toward inside of the partition wall.

6. The particulate filter according claim 1, wherein a ratio (W/V) of a total coating amount W of the wash-coating layer to an effective volume V of pores of the partition wall in the entire base material is 200 g/L or more and 400 g/L or less.

7. The particulate filter according to claim 6, wherein the wash-coating layer is substantially absent on a surface of the partition wall.

8. The particulate filter according to claim 1, wherein the noble metal catalyst contains at least one platinum-group element selected from the group consisting of Pt, Pd, and Rh.

9. The particulate filter according to claim 1, wherein the internal combustion engine is a gasoline engine.

* * * * *